Aug. 17, 1954  E. KOLISCH  2,686,426
EQUIPMENT FOR DETERMINING THE CENTER OF GRAVITY OF AIRCRAFT
Filed June 18, 1953  2 Sheets-Sheet 1
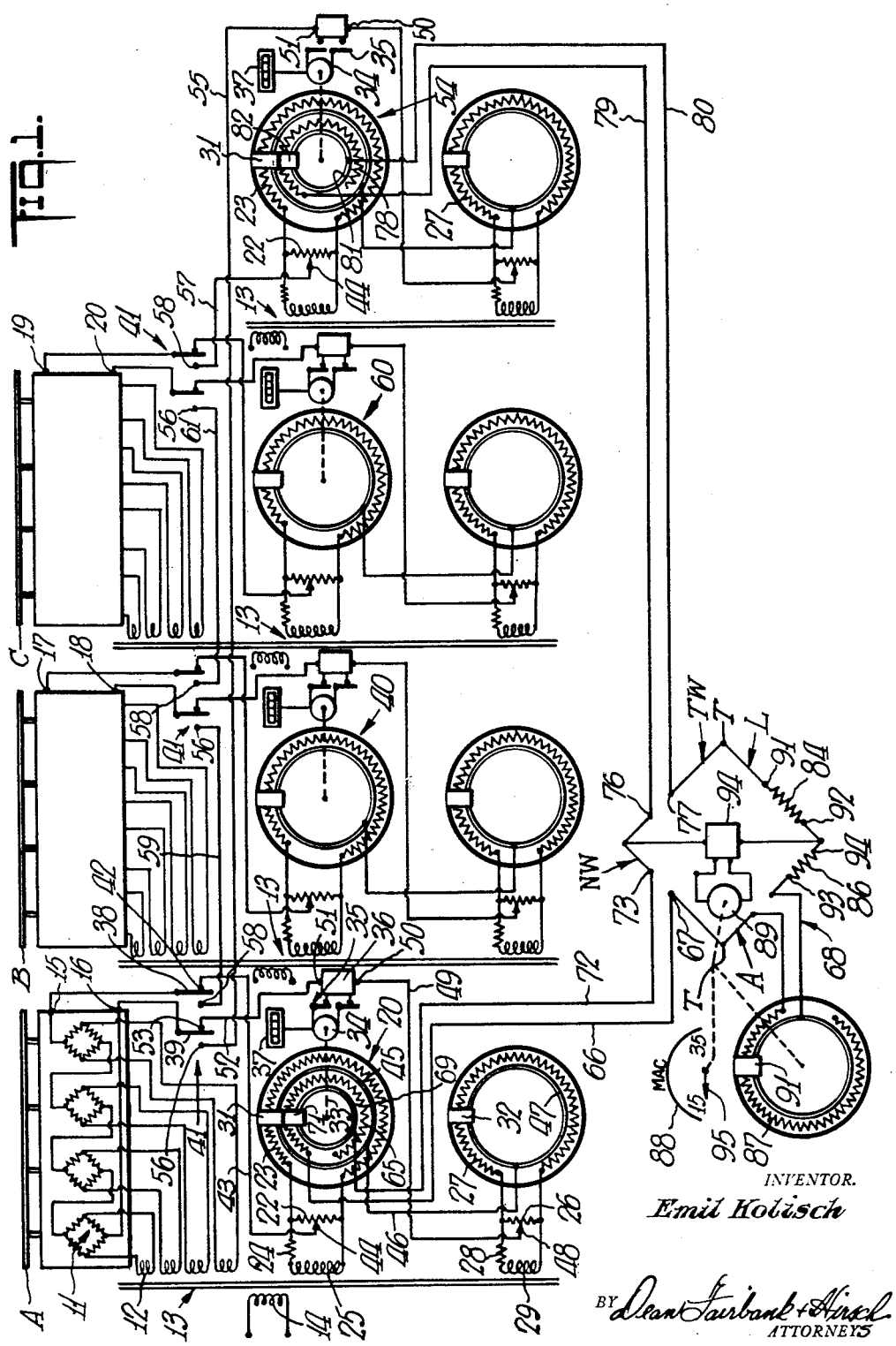
INVENTOR.
*Emil Kolisch*
BY *Dean Fairbank + Hirsch*
ATTORNEYS

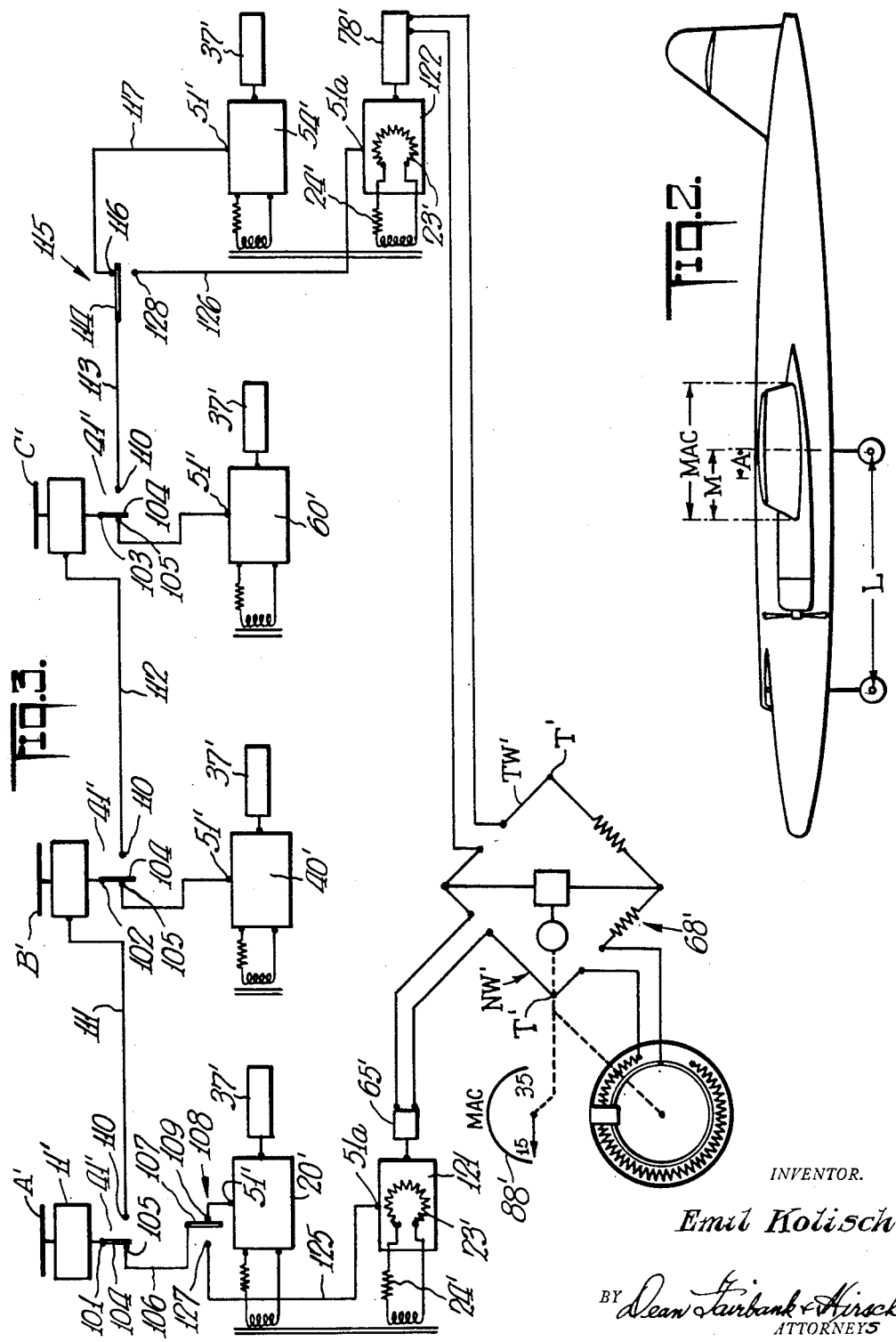

Patented Aug. 17, 1954

2,686,426

UNITED STATES PATENT OFFICE 2,686,426

EQUIPMENT FOR DETERMINING THE CENTER OF GRAVITY OF AIRCRAFT

Emil Kolisch, New York, N. Y., assignor to Continental Silver Co., Inc., a corporation of New York Application June 18, 1953, Serial No. 362,629

17 Claims. (Cl. 73—65)

1

As conducive to an understanding of the invention, it is noted that in order for an aircraft to take off, fly and land safely, its center of gravity along the length of the plane must be at some predetermined location which may vary between certain definite fixed limits.

These permissible fixed limits are determined by the manufacturer of the aircraft, ordinarily by flight tests, and are generally expressed as percentages of the mean aerodynamic chord. The mean aerodynamic chord (hereinafter designated "MAC") of an aircraft is described in text books as the chord of an airfoil, which is generally a definite segment between the leading and trailing edges of the wing. Any position along the MAC is commonly expressed as the percentage of its distance from the leading edge of the MAC with respect to the width of the MAC.

According to one present practice, the basic weight of an aircraft, i. e., without fuel, crew, safety equipment or cargo, but including all standard equipment, is determined generally by actually weighing the aircraft on suitable scales. The basic center of gravity is then calculated by utilizing suitable formulas.

Assuming that the aircraft is to travel to a predetermined destination requiring a given fuel load, the weight of which is readily ascertainable, a specialist in the Weights and Balances Division of an airport, taking into consideration the basic weight and basic center of gravity of the aircraft as well as the weight of the crew, fuel and safety equipment and the location of such items, may determine by means of a standard calculating device, such as a slide rule which is well known to those skilled in the art, the initial center of gravity of the aircraft.

The payload or weight of cargo is of course the permissible gross take off weight, less the basic weight of the aircraft, fuel, crew and safety equipment.

According to the present practice, the Cargo Loading Supervisor attempts to distribute the cargo, including passengers, along the length of the aircraft so that the final center of gravity of the fuly loaded aircraft will fall within the permissible limits of its MAC, generally near the middle.

Generally the heaviest cargo is loaded into a compartment which is adjacent to or between the permissible limits of the MAC. The weight of the successive items of cargo, generally indicated on each item by the shipper or manufacturer, and their position in the aircraft are noted on the manifest as the loading proceeds.

2

After the aircraft has been loaded, the manifest is turned over to the Weights and Balances Division of the airport, which transfers the data on the manifest to a specially designed slide rule which indicates the final or take off center of gravity of the aircraft as thus loaded.

Should the final center of gravity thus shown on the slide rule be outside of the permissible limits of the MAC, the Cargo Loading Supervisor will be advised that the cargo is improperly loaded and must be shifted. Thus if the aircraft is tail-heavy, cargo must be shifted forward and if the aircraft is nose-heavy cargo must be shifted toward the rear of the plane. It is apparent that such procedure is time-consuming and costly but must be followed, for it would be unsafe to attempt to fly the aircraft unless it was properly loaded.

For the foregoing reasons the personnel of the Weights and Balances Division must be highly trained and must perform their work with extreme care, for any errors in their calculations might have fatal consequences. As a result, the calculations of the Weights and Balances Division must be carefully checked and re-checked for errors and even with such checking, by reason of the human element involved, there is no assurance that some error has not remained undetected.

Inasmuch as the subsequent settings of the slide rule to determine the final center of gravity of the loaded aircraft depend upon the accuracy of its basic center of gravity determination, if any items of equipment should be added to or removed from the aircraft (as may occur in practice) without appropriate entries and calculations being made of the weight added or removed and the location of such weight, no matter how accurately the subsequent settings on the slide rule are made for the initial center of gravity determination with respect to crew members, fuel and safety equipment and the final center of gravity determination with respect to cargo, such slide rule determined final center of gravity may differ materially from the actual final center of gravity of the aircraft.

Even if all items added to or removed from the aircraft are properly listed and calculated, due to extraneous factors present at the time of take-off, the slide rule determined final center of gravity of the aircraft may in fact not be its actual final center of gravity. Thus for example, if the aircraft has been carrying bulk cargo such as grain, the collection of residues in the crevices of the aircraft, especially near the tail end, may add such moment that although the final center of gravity shown by the slide rule appears to be within the permissible limits of the MAC, the actual center of gravity is in fact outside of such limits. The aircraft may thus be tail-heavy. In addition, such factors as collection of moisture on the surfaces of the aircraft before take-off may add a moment that also will cause the actual final center of gravity at time of take-off to differ from that shown by the slide rule. In either event there is uneconomical fuel consumption during flight, and what is worse, the possibility of crash.

In addition to the reasons above given for the deviation from the actual final center of gravity of that shown by the slide rule, it is very possible that the weights of the items of cargo used in the calculations, if taken from the suppliers' markings on such items, may be inaccurate and such inaccuracy might also cause the actual final center of gravity of the aircraft to differ from that shown by the slide rule, with aggravation of the serious consequences above pointed out.

It is accordingly among the objects of the invention to provide an equipment which may readily be operated by even an unskilled person and which will automatically take into account the actual weight of the loaded aircraft and the actual position of its contents, without error due to erroneous marking of weights on the items of cargo, erroneous entries of weight or position on the manifest, omissions in entry or elimination of items of equipment added or withdrawn respectively from the aircraft, or the accumulation of cargo residues, dirt or moisture, and which will without need for time-consuming calculations or manipulations of any sort, and without the need for consulting tables or any other operation subject to human error, quickly and accurately indicate the actual final center of gravity of the aircraft, in order to facilitate checking that it is within the permissible limits set by the manufacturer for safe take-off, flying and landing.

Another object is to provide an equipment by which the actual position of center of gravity may be observed at all times as the loading proceeds, so as to dispense with the need for extensive shifting of the cargo in a fully loaded aircraft which may become necessary to assure safety when such guidance is not afforded.

Another object is to provide an equipment which directly and automatically effects a reading of center of gravity which shall be of construction simple, compact and light in weight, which shall be readily portable and which shall have a minimum of moving parts and thus not be likely to become deranged in transportation or use.

Another object is to provide an equipment of the above character which is universally applicable, by resort to a simple manipulation to be set for any of various models, sizes and specifications of aircraft.

According to the invention from its broader aspects, the equipment comprises facilities whereby an electric impulse such as may be controlled by variable impedance units related to the weight, is introduced, preferably in response to the actual weight on the respective wheels of the aircraft, viz., the main wheels and the additional wheel (i. e., nose wheel or tail wheel). The weight controlled impedances are additively connected, in series for example, where such impedances are ohmic resistances and current from a common or from separate sources is passed through the additively connected impedances in opposition to a balancing impedance unit. Motor means controlled by resultant difference of potential adjusts the balancing impedance unit and at the same time adjusts another impedance unit TW to a value corresponding to total weight of the aircraft. Another impedance unit NW corresponding to weight on the additional wheel is placed into a bridge circuit with the impedance unit TW for total weight, said circuit also including a further impedance unit L of value corresponding to distance between the additional wheel and the main wheel, and a fourth variable impedance unit which controls the reading of center of gravity position. The impedance units TW and NW are in different arms of the bridge circuit and the impedance units L and the fourth variable impedance unit are also in different arms of the bridge circuit. The bridge circuit is of the self-balancing type automatically to set the fourth variable impedance unit, which by means of an indicator under its control, shows center of gravity, desirably in terms of percent MAC. By a simple setting instantly effected, the equipment may be adapted to introduce into the bridge such impedance as corresponds to the distance between the main and the additional wheels and thereby one and the same field equipment serves for checking any of various types of aircraft.

This application relates to the same general subject matter as that shown and described in copending application Serial No. 273,493, filed February 26, 1952, and the structure disclosed in this application is a species coordinate with that disclosed in said co-pending application, and all claims generic to the said two species are asserted in this application.

In the accompanying drawings in which are shown one or more of various possible embodiments of the several features of the invention, Fig. 1 is a diagrammatic view of one embodiment of the invention, Fig. 2 is a diagrammatic view of an aircraft, and Fig. 3 is a diagrammatic view of a modification of Fig. 1.

In the illustrative embodiment of Fig. 1 of the drawings, platforms diagrammatically shown at A, B and C are provided to carry the additional wheel, usually the nose wheel of the aircraft and the main wheels, respectively.

Associated with each of the platforms are preferably weight responsive devices which may be suitable impedance units such as networks of strain gauges 11 of familiar type commonly known as "load cells," usually four in number to support the respective corners of the ordinarily rectangular platform. As diagrammatically shown, with respect to platform A, a transformer 13, the primary winding 14 of which is connected to a source of alternating current, has secondary windings 12 connected respectively to the inputs of the several strain gauges 11. Like transformers 13 are similarly related to the strain gauges on platforms B and C. The outputs of all of the strain gauges of each platform are connected in series, as shown, and when subjected to the weight borne on the platform, the voltage evolved by the strain gauges under the applied potential will be applied respectively across terminals 15, 16 of platform A; terminals 17, 18 of platform B and terminals 19, 20 of platform C.

According to the illustrative embodiment herein shown, in order correctly and automatically to determine the weight on any platform, the voltage output of the associated strain gauges due to the weight of the unloaded platform is first balanced out as by a countervailing voltage, and then the output voltage of the strain gauges, due to the load on the platform is balanced out also by a countervailing voltage, the same means which regulates such latter countervailing voltage controlling an indicator calibrated in increments of weight.

Although any suitable balancing circuit may be used, in the illustrative embodiment herein shown with respect to platform A, such balancing circuit 20 desirably includes a pair of parallel connected resistances 22 and 23, which are connected in series with a resistance 24 to a secondary winding 25 of the transformer 13, and a second pair of parallel connected resistances 26 and 27 connected in series with a resistance 28 to another secondary winding 29 of the transformer 13. The two resistances 23 and 27 serve as voltage dividers, as hereinafter set forth.

Although the resistances 23 and 27 may be of any suitable type, they each desirably form part of a potentiometer having a movable contact arm 31, 32, respectively. The contact arm 32 is manually adjustable to any desired setting in order to balance out the weight of the unloaded platform. The contact arm 31 is controlled by the shaft 33 for automatic setting to balance out the load on the platform, by means of a servo-motor 34 which in turn is connected through a pair of normally closed switches 35 to a servo-amplifier 36. The servo-motor and servo-amplifier may be of the type sold by Brown Instrument Company. The shaft 33 desirably controls a suitable indicator, illustratively a counter 37 such as that put out by Veeder Root Company which is calibrated in increments of pounds to indicate the weight borne by platform A.

The output terminals 15, 16 of platform A are desirably connected respectively to the movable arms 38 and 39 of a double pole double throw switch 41. The fixed contact 42 of the switch 41 normally engaged by the contact arm 38, is connected by lead 43 to an adjustable tap 44 engaging the resistance 22. The contact arm 31 engaging the resistance 23, also engages an associated contact ring 45 concentric with resistance 23 and connected by lead 46 to a contact ring 47 associated and concentric with resistance 27 and also engaged by the contact arm 32. The resistance 26 is desirably center tapped as at 48 and such center tap is connected by lead 49 to terminal 50 of servo-amplifier 36, the other terminal 51 of the servo-amplifier being connected by lead 52 to fixed contact 53 normally engaged by contact arm 39.

The balancing circuits 40 and 60 for platforms B and C are identical to the circuit just described for platform A.

In addition to the platform balancing circuits 20, 40 and 60, a further balancing circuit 54 is provided which is also indentical to the balancing circuit for platform A except that the associated transformer 13 has only two secondary windings; the terminal 51 of the associated servo-amplifier 36 is connected by lead 55 to fixed contact 56 of platform A and the center tap 44 of resistor 22 is connected by lead 57 to fixed contact 58 of platform C. The fixed contact 58 of platform A is connected by lead 59 to fixed contact 56 of platform B and the fixed contact 58 of this platform is connected by lead 61 to fixed contact 56 of platform C. The switching arrangement thus described permits connection of the strain gauges of the three platforms, A, B and C in series, for a total weight indication on the counter 37 associated with balancing circuit 54 in the manner hereinafter described.

Associated with the resistance 23 of the balancing circuit 20 of platform A is a resistance 65 which has a conducting ring 69 concentric therewith. A contact arm 71 connected to move in unison with arm 31 for engaging both said resistance and conducting ring is controlled by the servo-motor 34 to place so much of resistance 65 in circuit which is related to the setting of contact arm 31 with respect to resistance 23. One end of resistance 65 is connected by lead 66 to a terminal 67 of a center of gravity bridge circuit 68 and the conducting ring 69 is connected by lead 72 to terminal 73 of the bridge circuit 68. Accordingly, there will be introduced into arm NW of said circuit, so much of resistance 65 as corresponds to the weight on the platform A.

The bridge circuit 68 has an arm TW having terminals 76 and 77 between which is to be introduced a resistance corresponding to the total weight of the aircraft, that is, the combined weight on platforms A, B and C. The resistance 23 of balancing circuit 54 has an associated resistance 78 having a contact ring 81 concentric therewith, and a contact arm 82 connected to move in unison with arm 31 for engaging both said resistance and conducting ring is controlled by the servo-motor 34 of balancing circuit 54 to place so much of resistance 78 in circuit which is related to the setting of contact arm 31 with respect to resistance 23. One end of resistance 78 is connected by lead 79 to terminal 76 in arm TW of the bridge circuit 68, and the conducting ring 81 is connected by lead 80 to terminal 77 of arm TW of the bridge circuit. Accordingly, there will be introduced into arm TW so much of resistance 78 as corresponds to the combined weight on the three platforms.

A third arm L of the bridge 68 opposed to arm NW includes a resistance 84 which is of value corresponding to the distance between the main wheels and the additional wheel. The fourth arm A opposed to arm TW may include a resistance 86 in series with a variable resistance 87 which is associated with a dial scale 88 to give an indication of center of gravity position. This indication is accomplished automatically by a servo-motor 89 driving the contact arm 91 of the resistance 87 and under control of a servo-amplifier 94 across the bridge 68, responding to any unbalance between the resistances in the four arms. The balanced position of the variable resistance 87 indicates the distance of the center of gravity from the main wheels according to the formula:

$$\frac{A}{L} = \frac{NW}{TW}$$

where, as shown in Fig. 2, A is distance of center of gravity from the main wheels, (resistance 86+resistance 87) L is distance of additional or nose wheel from the main wheels (resistance 84), NW is the nose wheel weight (resistance 65) and TW is the total weight (resistance 78).

The four impedances or resistance elements in the respective arms TW, NW, L and A of the bridge may be arranged in any manner desired, provided only that arms TW and A are opposed and a source of current is connected to terminals T of said bridge 68.

Where the equipment above described is to be used to check but a single model of aircraft, the resistance 86 may be eliminated and the resistance 84 may be permanently connected between terminals 91 and 92.

Where the equipment is to be utilized to check various models of aircraft and the center of gravity position is to be given in terms of percent MAC for all such models on the single dial scale 88, the resistances 84 and 86 in arms L and A respectively are specially calibrated in the manner hereinafter to be described and they preferably are incorporated in a single plug-in unit (not shown) having prongs for connection between terminals 91, 92 and 93, 94 respectively.

The resistances 84 and 86 as well as the other resistances used in the equipment are illustratively calibrated for one pound to equal one ohm and one inch to equal one ohm.

Referring to Fig. 2:

(a) $M-A$ = distance from the leading edge of MAC to center of gravity (b) $\frac{M-A}{MAC} \times 100 = \text{percent } MAC$ where M is the distance from the main wheels to the leading edge of the MAC.

As for any model aircraft, M and MAC are both fixed, it follows that for every value of A there is a corresponding value of percent MAC.

Assuming that the dial scale 88 is to give indications of percent MAC from 15 to 35, using Formula b, the following table may be calculated for various models of aircraft, illustratively shown for the two models X and Y which have MAC's of 200 and 150 inches, values of M of 100 and 70 inches and values of L of 350 and 320 inches respectively.

*Table I*

MODEL X

| Percent MAC | A | M | L | MAC |
|---|---|---|---|---|
| 15 | 70 | 100 | 350 | 200 |
| 35 | 30 | 100 | 350 | 200 |

MODEL Y

| | | | | |
|---|---|---|---|---|
| 15 | 47.5 | 70 | 320 | 150 |
| 35 | 17.5 | 70 | 320 | 150 |

Selecting aircraft X as the basic aircraft for which the scale dial 88 is to be calibrated, at 35% MAC A is equal to 30 ohms and at 15% MAC A is equal to 70 ohms. Hence when the pointer 85 controlled by the servo-motor 89 is at 35% MAC the value of the resistance 87 in circuit is zero ohms, the value of plug-in resistance 86 is 30 ohms and the value of resistance 84 is 350 ohms.

As resistance 86 of 30 ohms remains in circuit for aircraft X, then at 15% MAC the value of resistance 87 in circuit is 40 ohms, i. e. 70—30. Consequently, the limits of center of gravity between 15 and 35% MAC for a model X aircraft will be related to an ohmic difference of 40 and each 1% of the MAC on dial 88 equals 2 ohms of resistance 87.

The difference between the values of A for model Y aircraft between the limits of 15 and 35% MAC is equal to 47.5—17.5 or 30 ohms. To determine the value of the resistances 84 and 86 for such model Y aircraft, the ratio of the difference between the limits of A for aircrafts model X and Y is calculated as follows:

$$\frac{40}{30} = 1\tfrac{1}{3}$$

This value of 1⅓ is used as a multiplying factor for resistances 84 and 86, adapting the dial scale calibrated for aircraft X to render it suitable for aircraft Y. Thus, A for aircraft Y at 35% MAC or 17.5 is multiplied by 1⅓ and equals 23⅓ and L is equal to 320 multiplied by 1⅓ or 426⅔.

For checking an aircraft model Y, for example, the plug-in unit for that particular type of aircraft is put into circuit with its resistance 84 between terminals 91, 92 and its resistance 86 between terminals 93, 94, equal respectively to 426⅔ and 23⅓ ohms as heretofore described.

With the switches 41 and 35 of platforms A, B, and C in the position shown, and with switches 35 of balancing circuit 54 open, when the additional wheel and two main wheels of the aircraft rest upon platforms A, B and C respectively, the series connected strain gauges 11 of each of the platforms will provide a voltage across the associated terminals 15, 16; 17, 18 and 19, 20 proportional to the weights on the respective wheels.

As a result, such voltages will be applied in series with voltages opposite in polarity from the series connected voltage dividers 23 and 27, across the respective terminals 50 and 51 of servo-amplifiers 36 and if such opposed voltages are unequal, the associated motor 34 will be energized to turn shaft 33 and move contact arm 31.

When each contact arm 31 has reached that portion of the corresponding resistance 23 which provides a voltage equal to that supplied from the output terminals of the associated platforms, balance will be achieved, so that the motor 34 will stop rotating and the counter 37 driven by shaft 33 will indicate the weight on the associated platform. The contact arm 71 of balancing circuit 29 will at the same time tap off so much of resistance 65 which is of ohmic value proportional to the weight on the additional wheel and such portion of resistance 65 will be connected across terminals 67, 73 in arm NW of bridge 68.

Thereupon the contact arms 38, 39 of switches 41 are actuated to engage fixed contacts 53 and 56 respectively; and at the same time the switches 35 of platforms A, B and C are opened, so that the associated counter 37 remains in set position and the switches 35 of balancing circuit 54 is closed.

The switches 41 thus set, connect the strain gauges 11 of all three platforms in series and the combined voltage in series with the voltage from the associated voltage dividers 23, 27 will be applied to terminals 50 and 51 of servo-amplifier 36 of balancing circuit 54. As previously described, with respect to the balancing circuit for platform A, the servo-motor 34 of circuit 54 will rotate contact arm 31 until so much of resistance 23 is tapped off that the combined voltage through resistances 23 and 27 is equal to the combined voltage from the series connected strain gauges 11 of the three platforms, at which time there is no potential across motor 34 which then stops rotating. The contact arm 82 will tap off so much of resistance 78 which is of ohmic value proportional to the total weight of the aircraft and such portion of resistance 78 will be connected across terminals 76, 77 of bridge 68.

For a model Y aircraft, assuming the weight on the additional wheel is 6,000 pounds and the total weight on the three wheels is 50,000 pounds, arms NW, TW and L of the bridge will have resistance in circuit of 6,000, 50,000 and 426⅔ ohms respectively. Arm A will have resistance 66 of 23⅓ ohms in series with variable resistance 87.

Thus, the formula:

$$\frac{A}{L} = \frac{NW}{TW}$$

$$\frac{\text{Resistance } 87 + 23\frac{1}{3}}{426\frac{2}{3}} = \frac{6,000}{50,000}$$

is solved for the resistance 87 as 27.87 ohms.

As 2 ohms corresponds to 1% MAC on dial 88, 27.87 ohms corresponds to $$\frac{27.87}{2}$$

or 13.94% MAC on such dial. Since the point of reference is 35% MAC, the MAC of the model Y aircraft would be 35% less 13.94% or 21.06% indicated by pointer 95 upon dial 88.

The equipment shown in Fig. 1 is especially suitable for use where each of the networks of strain gauges 11 associated with platforms A, B and C is designed to handle the maximum weight that can be carried by the associated wheel, the weight carried by the additional wheel being considerably less than that carried by each of the main wheels.

Where the strain gauges associated with one or more of the platforms are designed to handle weights far in excess of that to which they may be subjected in practice, the circuit shown in Fig. 3 may be used in order to provide in this embodiment accuracy of reading corresponding to that attained in the embodiment of Fig. 1.

As the circuit of Fig. 3 is substantially identical to that of Fig. 1, it is shown only in general outline and will be described only sufficiently for a clear understanding of the invention, with corresponding parts having the same reference numerals primed as those of Fig. 1.

The network of strain gauges 11' associated with each of the platforms A', B' and C' is calibrated to handle the maximum weight which each main wheel is to carry. The output of each of the strain gauge networks associated with the respective platforms is indicated by a single terminal 101, 102 and 103 respectively, corresponding to the terminals 15, 16; 17, 18 and 19, 20 of Fig. 1.

Each output 101, 102 and 103 is connected to the contact arm 104 of a switch 41' which is identical to the double pole double throw switches 41 and normally engages fixed contact 105 connected by lead 106 to the contact arm 107 of a switch 108, said arm 107 engaging fixed contact 109 connected to an associated balancing circuit 26', 40' and 69' respectively and the weight on the associated platform is indicated on a counter 37'.

Each of the switches 41' has a second fixed contact 110, the contact 110 of the switch 41' associated with platform A' being connected by line 111 to the strain gauges of platform B'; the contact 110 of the switch 41' associated with platform B' being connected by lead 112 to the strain gauges of platform C' and the contact 110 of the switch 41' associated with platform C' being connected by lead 113 to the contact arm 114 of a switch 115 which engages fixed contact 116 connected by lead 117 to balancing circuit 54'. Thus, when the contact arms 104 of the switches 41' engage fixed contact 110, the strain gauges will be connected in series for indication of the total weight on counter 37' of balancing circuit 54'. The switches 108 and 115, as shown, are identical to switches 41', i. e., they are also double pole double throw switches.

As the balancing circuit 26' associated with platform A' for the additional wheel is designed to take the maximum weight that can be carried by each of the main wheels of the aircraft, i. e. up to 200,000 pounds for example, and as in practice the maximum weight actually carried by platform A' is only a fraction of such weight, i. e., say 20,000 pounds, only a small fraction, say one-tenth of resistance 23' of circuit 26' would ever be placed into circuit. This would detract from the accuracy of the equipment especially with respect to its automatic determination of center of gravity.

Such inaccuracy would also be present in the balancing circuit 54' for the total weight of the aircraft, since it is capable of indicating 600,000 pounds, for example, whereas in practice a much lesser amount would ever be applied thereto, i. e. only 220,000 pounds and as only a fraction of resistance 23' would ever be placed into circuit this would also detract from the accuracy of the equipment with respect to its determination of center of gravity.

In order to obviate such inaccuracies, two additional balancing circuits 121 and 122 are provided, the input terminals 51ᵃ thereof being connected respectively by leads 125 and 126 to fixed contacts 127 and 128 of switches 108 and 115.

The balancing circuits 121 and 122 are identical in all respects to circuits 26' and 54' except that the series resistances 24' of said balancing circuits are of greater value so that weights of 20,000 pounds and 220,000 pounds, for example, on platform A' and the three platforms A', B' and C' combined, would require substantially the entire length of the resistances 23' of balancing circuits 121 and 122 to be placed into circuit to provide a voltage equal respectively to that from the platforms A' and platforms A', B' and C' combined.

As the entire lengths of resistances 23' of balancing circuits 121 and 122 are utilized for the weight of 20,000 pounds on the additional wheel and the total weight of 220,000 pounds respectively, the balancing voltages from resistances 23' of circuits 121 and 122 will closely approximate the opposed voltage from the strain gauges respectively of platform A' and platforms A', B' and C' combined so that the value of resistances 65' and 79' placed in the bridge circuit 68' will be related to the actual weight on the additional wheel and all three wheels respectively.

In the operation of the circuit shown in Fig. 3, when switches 41' are in the position shown, the weights on each wheel will be indicated on counters 37' of platform A', B' and C'. When arms 104 of switches 41' thereupon are moved to engage contacts 110, with arm 114 of switch 115 engaging contact 116 the total weight on all three wheels will be indicated on the counter 37' of circuit 54'. Thereupon by moving arms 104 and 107 of switch 41' of platform A' and switch 108 into engagement with contacts 105 and 127 respectively, the weight on the additional wheel as determined by resistance 65' is connected into arm NW' of bridge 68'. Arms 104 of all the switches 41' are then moved into engagement with contacts 110 and arm 114 of switch 115 is moved into engagement with contact 128 to connect the combined weight on all three wheels as determined by resistance 78' into arm TW' of bridge 68'. The bridge 68' will then give a center of gravity indication on dial 88' in terms of percent MAC, as previously described with respect to the embodiment of Fig. 1.

While in the specification and drawings, strain gauges have been shown as the impedance elements to measure weight, it is of course to be understood that other types of weight determining means such as hydraulic cells, beam or spring scales and the like could be used to place appropriate impedance in circuit.

It is further to be understood that although the impedances as illustrated in the specification and drawings are resistances, other types of impedances such as reactances containing either or both inductances and capacitances could be used for the purpose.

It will be clear that the equipment of the present invention may be used to determine the position of the center of gravity of any of a multiplicity of types of aircraft and to indicate such position in terms of percent MAC on but a single dial scale. All that is required is to have for each model of aircraft, plug-in resistances 84, 86 calibrated in the manner previously set forth.

Where the equipment is to serve but a single model aircraft, the same dial scale could be calibrated for percent MAC or distance in inches from any reference datum to the center of gravity position; the resistance 84 could be fixed and the equipment could be carried by the aircraft if desired.

Where the equipment is capable of universal use for various models of aircraft, it ordinarily will be retained on the airfield, but if desired, can be carried by an aircraft and set to fit its particular requirements as above described.

As many changes could be made in the above system and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for determining the distance of the center of gravity from a given reference datum of an aircraft of the type having main wheels and an additional wheel, comprising variable impedance units, respectively calibrated for response proportional to the weight carried by such wheels, means connecting said variable impedance units for addition of the weight controlled responses, a variable balancing impedance unit, an additional impedance unit, means to pass opposing currents through said connected and said balancing impedance units, means controlled by resultant difference of potential to adjust both said balancing and said additional impedance units until difference of potential is eliminated, thereby to place into circuit such portion of the additional impedance unit as corresponds to the total weight of the aircraft, a second additional impedance unit, means to place into circuit such portion of the latter impedance unit as corresponds to the weight on the additional wheel, a further impedance unit of value corresponding to distance between the additional wheel and the reference datum, a bridge including said additional, said second additional and said further impedance units together with a fourth variable impedance unit, with said first and second impedance units in different arms and said third and fourth impedance units in different arms, means controlled by a current through the arms of the bridge to adjust said fourth variable impedance until difference of potential across the bridge has been eliminated, and an indicator under control of said variable impedance which shows the distance from the point of reference to the center of gravity.

2. The combination recited in claim 1 in which those impedances that correspond to the weights on the respective wheels are associated with corresponding platforms upon which such wheels are rested and the setting of each such impedance is effected automatically by the weight upon its associated platform.

3. The combination recited in claim 1 in which the impedance units in the bridge are ohmic resistances.

4. The combination recited in claim 1 in which the additively connected and the balancing impedance units all are ohmic resistances.

5. The combination recited in claim 1 in which each of the two means by which difference of potential is eliminated comprises a servo-motor operatively connected to the corresponding variable impedance unit and an associated servo-amplifier responding to applied difference of potential.

6. The combination recited in claim 1 in which each of the two means by which difference of potential is eliminated comprises a servo-motor operatively connected to the corresponding variable impedance unit, an associated servo-amplifier responding to applied difference of potential, and in which the additional impedance unit is controlled by the corresponding servo-motor.

7. The combination recited in claim 1 in which the variable impedance units calibrated for weight response of each wheel are load cells all connected in series.

8. The combination recited in claim 1 in which the currents are alternating and supplied from a common source.

9. The combination recited in claim 1 in which the four arms of the bridge respectively contain the four impedances thereof with the additional and the variable impedances in opposed arms.

10. The combination recited in claim 9 in which the variable impedance has in series and in the same arm therewith an impedance that affords a particular limiting reading of center of gravity position for a particular model of aircraft.

11. The combination recited in claim 1 in which the means to place into circuit such portion of that impedance unit which corresponds to the weight on the additional wheel is means substantially identical with that recited in claim 1 for eliminating the difference of potential and for placing into circuit such portion of that impedance unit which corresponds to the total weight of the aircraft.

12. The combination recited in claim 11 in which means are provided to switch that variable impedance unit which is under control of the weight on the additional wheel from additive connection to those variable impedance units under control of the weight on the main wheels, to a connection to control the means to place into circuit such portion of the second additional impedance unit as corresponds to the weight on the additional wheel and an indicator controlled by said last named means serves for reading weight on the additional wheel.

13. The combination recited in claim 1 in which a plurality of indicators are provided for reading weight on each of the main wheels and the additional wheel respectively and switch means serves to interrupt the additive connection of said variable impedance units and individually to connect each variable impedance unit to control the associated indicator for reading weight on the corresponding wheel.

14. The combination recited in claim 1 in which an indicator is provided for reading weight on the additional wheel and means are provided to switch that variable impedance unit that is under control of the weight on the additional wheel from additive connection to the variable impedance units under control of the weight on the main wheels to alternative circuits, one of which controls said indicator for reading weight on the additional wheel and the other of which includes the means to place into circuit such portion of the second additional impedance unit as corresponds to the weight on the additional wheel.

15. The combination recited in claim 1 in which an indicator is provided for reading the total weight on the wheels of the aircraft and means are provided to switch the additively connected variable impedance units from a setting controlling said indicator for reading the total weight on said wheels to a setting for controlling the additional impedance unit which corresponds to the total weight of the aircraft.

16. The combination recited in claim 1 in which the indicator for the center of gravity has a single dial calibrated between limits for a basic aircraft, an impedance is in series and in the same bridge arm with the variable impedance, said series impedance and the further impedance are of value proportional respectively to distance of the center of gravity from the main wheels of another aircraft at one of such limits and the distance between the additional wheel and the main wheel of such other aircraft, each multiplied by a factor proportional to the ratio of the difference between the limits of center of gravity position for the basic aircraft and the difference between the limits of center of gravity position for such other aircraft.

17. The combination recited in claim 16 in which the series impedances and the further impedance are parts of a single replaceable plug-in device by which they may be readily introduced into circuit into the bridge for each model of aircraft as required.

References Cited in the file of this patent

UNITED STATES PATENTS

| Number | Name | Date |
| --- | --- | --- |
| 2,373,504 | Schlieben et al. | Apr. 10, 1945 |
| 2,443,045 | Magruder et al. | June 8, 1948 |
| 2,443,098 | Dean | June 8, 1948 |
| 2,453,607 | Wardle et al. | Nov. 9, 1948 |
| 2,540,807 | Berry | Feb. 6, 1951 |
| 2,541,429 | Mathes, Jr., et al. | Feb. 13, 1951 |
| 2,615,330 | Blackmon et al. | Oct. 28, 1952 |